US010122790B2

(12) United States Patent
Cardote

(10) Patent No.: US 10,122,790 B2
(45) Date of Patent: Nov. 6, 2018

(54) SYSTEMS AND METHODS FOR VEHICLE TRAFFIC MANAGEMENT IN A NETWORK OF MOVING THINGS

(71) Applicant: Veniam, Inc., Mountain View, CA (US)

(72) Inventor: Andre Cardote, Aveiro (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/215,905

(22) Filed: Jul. 21, 2016

(65) Prior Publication Data

US 2017/0085632 A1 Mar. 23, 2017

Related U.S. Application Data

(60) Provisional application No. 62/222,183, filed on Sep. 22, 2015.

(51) Int. Cl.
| | |
|---|---|
| *G06F 15/16* | (2006.01) |
| *H04L 29/08* | (2006.01) |
| *H04W 4/04* | (2009.01) |
| *H04W 4/70* | (2018.01) |
| *H04W 4/80* | (2018.01) |
| *H04W 84/12* | (2009.01) |

(52) U.S. Cl.
CPC ......... *H04L 67/1002* (2013.01); *H04L 67/02* (2013.01); *H04W 4/046* (2013.01); *H04W 4/70* (2018.02); *H04W 4/80* (2018.02); *H04W 84/12* (2013.01)

(58) Field of Classification Search
CPC .... G08G 1/04; G08G 1/096716; H04L 67/02; H04L 67/1002; H04W 4/005; H04W 4/008; H04W 84/12; H04W 88/08
See application file for complete search history.

(56) References Cited

U.S. PATENT DOCUMENTS

| 6,064,319 | A   | * | 5/2000  | Matta ..................... G08G 1/087 |
|-----------|-----|---|---------|----------------------------------------|
|           |     |   |         | 340/902                                |
| 9,142,127 | B1  | * | 9/2015  | McDevitt-Pimbley ......................|
|           |     |   |         | G08G 1/091                             |
| 2003/0004792 | A1 | * | 1/2003  | Townzen ............... G07B 15/00  |
|           |     |   |         | 705/13                                 |
| 2004/0196162 | A1 | * | 10/2004 | Brooke .................... G08G 1/20 |
|           |     |   |         | 340/906                                |
| 2006/0137090 | A1 | * | 6/2006  | Jeffries ............... G01M 3/2807 |
|           |     |   |         | 4/664                                  |
| 2007/0008173 | A1 |   | 1/2007  | Schwartz                               |
| 2007/0273552 | A1 | * | 11/2007 | Tischer ................... G08G 1/01  |
|           |     |   |         | 340/910                                |

(Continued)

OTHER PUBLICATIONS

PCT International Search Report dated Dec. 15, 2016 for PCT Patent Application No. PCT/US2016/52929.

(Continued)

*Primary Examiner* — Christopher Biagini
(74) *Attorney, Agent, or Firm* — McAndrews, Held & Malloy, Ltd.

(57) ABSTRACT

Systems and methods for traffic management in a network of moving things. As non-limiting examples, various aspects of this disclosure provide systems and methods for utilizing vehicles, vehicle sensors, and/or vehicle-based networks of the Internet of moving things for traffic control optimization.

13 Claims, 15 Drawing Sheets

(56) References Cited

U.S. PATENT DOCUMENTS

| | | | |
|---|---|---|---|
| 2008/0147253 A1* | 6/2008 | Breed | B60W 30/16 |
| | | | 701/3 |
| 2009/0174572 A1* | 7/2009 | Smith | G08G 1/0965 |
| | | | 340/902 |
| 2009/0312899 A1 | 12/2009 | Mitchell | |
| 2011/0095908 A1* | 4/2011 | Nadeem | B60H 3/00 |
| | | | 340/905 |
| 2011/0130957 A1 | 6/2011 | M et al. | |
| 2012/0092187 A1* | 4/2012 | Scholl | G08G 1/04 |
| | | | 340/905 |
| 2012/0112927 A1 | 5/2012 | Grieco et al. | |
| 2012/0245756 A1 | 9/2012 | Cooprider et al. | |
| 2012/0290150 A1 | 11/2012 | Doughty et al. | |
| 2013/0041941 A1* | 2/2013 | Tomasic et al. | G08G 1/123 |
| | | | 709/203 |
| 2013/0099941 A1* | 4/2013 | Jana | H04W 4/023 |
| | | | 340/905 |
| 2013/0013179 A1* | 10/2013 | Lection et al. | G08G 1/0145 |
| | | | 701/117 |
| 2014/0139358 A1* | 5/2014 | Lee | G08G 1/092 |
| | | | 340/907 |
| 2014/0277917 A1 | 9/2014 | Banet et al. | |
| 2014/0278029 A1* | 9/2014 | Tonguz | G08G 1/087 |
| | | | 701/117 |
| 2014/0316635 A1 | 10/2014 | Bando et al. | |
| 2015/0195765 A1* | 7/2015 | Bhardwaj | H04W 40/02 |
| | | | 370/338 |
| 2015/0213713 A1 | 7/2015 | Taylor | |
| 2016/0174106 A1* | 6/2016 | Lee | H04W 40/20 |
| | | | 705/14.63 |
| 2016/0242204 A1* | 8/2016 | Hogan | H04W 72/1284 |

OTHER PUBLICATIONS

Notification Concerning Transmittal of International Preliminary Report on Patentability; International Preliminary Report on Patentability, dated Apr. 5, 2018 corresponding to International Application No. PCT/US2016/052929.

* cited by examiner

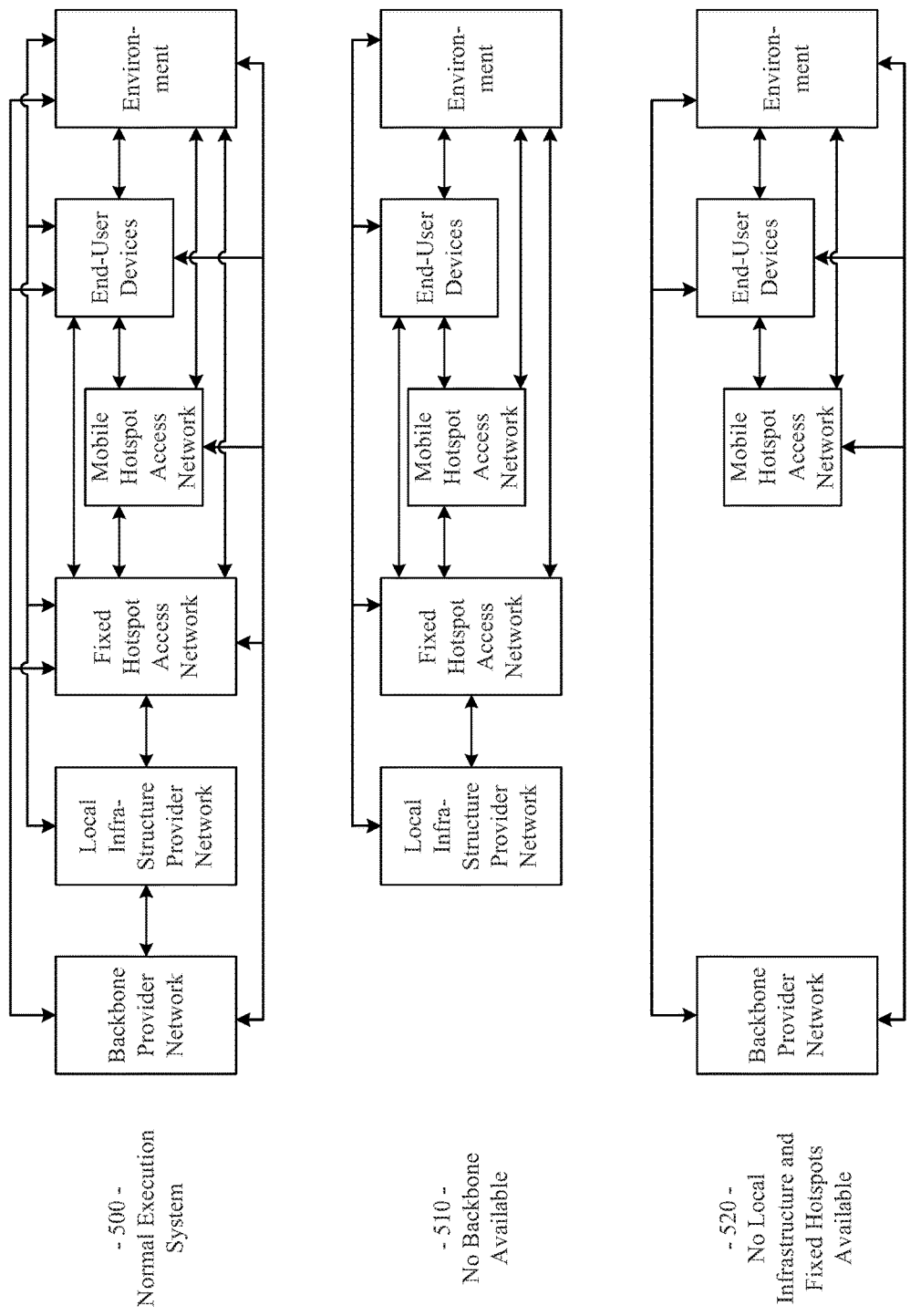

SYSTEMS AND METHODS FOR VEHICLE TRAFFIC MANAGEMENT IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/222,183, titled "Systems and Methods for Vehicle Traffic Management in a Network of Moving Things," filed on Sep. 22, 2015. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current traffic management systems are inefficient, for example failing to leverage a vast array of information available to them. As a non-limiting example, current traffic management systems do not take full advantage of the Internet of moving things. Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIGS. 5A-5C show a plurality of network configurations illustrating the flexibility and/or and resiliency of a communication network, in accordance with various aspects of this disclosure.

SUMMARY

Figure 1:
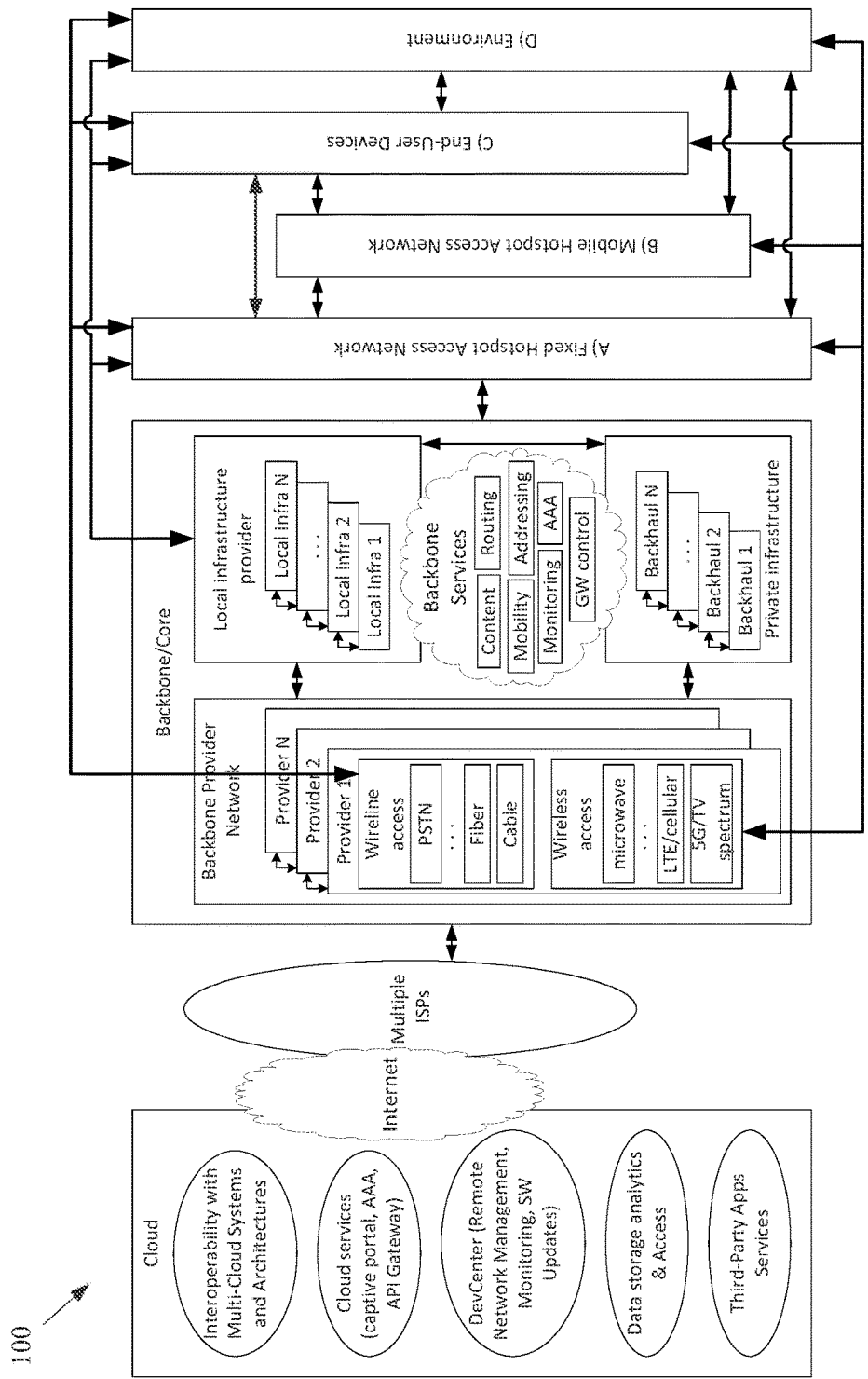
FIG. 1 shows a block diagram of a communication network, in accordance with various aspects of this disclosure.

Various aspects of this disclosure provide systems and methods for traffic management in a network of moving things. As non-limiting examples, various aspects of this disclosure provide systems and methods for utilizing vehicles, vehicle sensors, and/or vehicle-based networks of the Internet of moving things for traffic control optimization. For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, nodes, networks, and/or network components 200, 300, 400, 500-570, 600, 700, 800, 900, 1000, 1100, 1200, and 1300, shown and/or discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
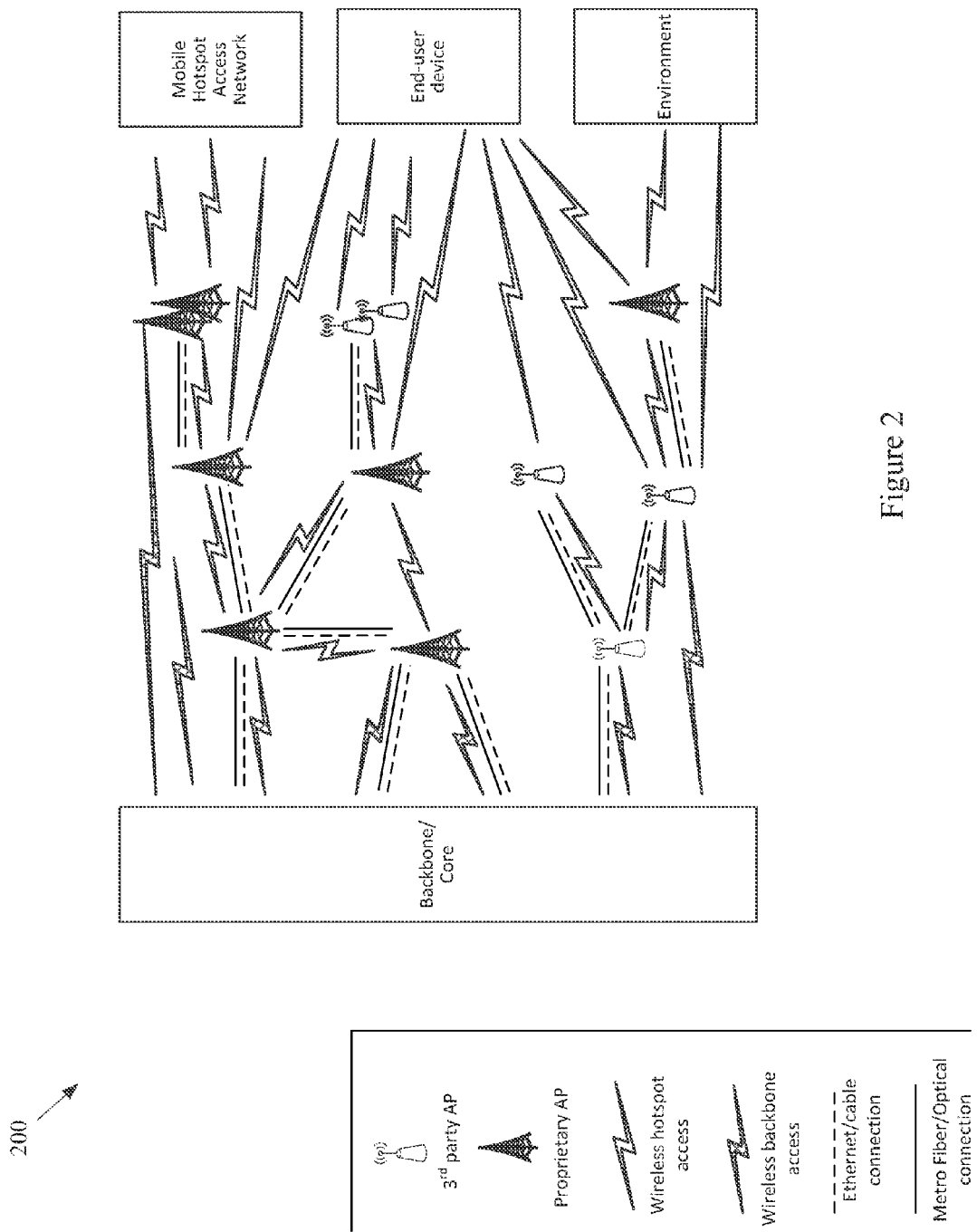
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, nodes, networks, and/or network components 100, 300, 400, 500-570, 600, 700, 800, 900, 1000, 1100, 1200, and 1300, shown and/or discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
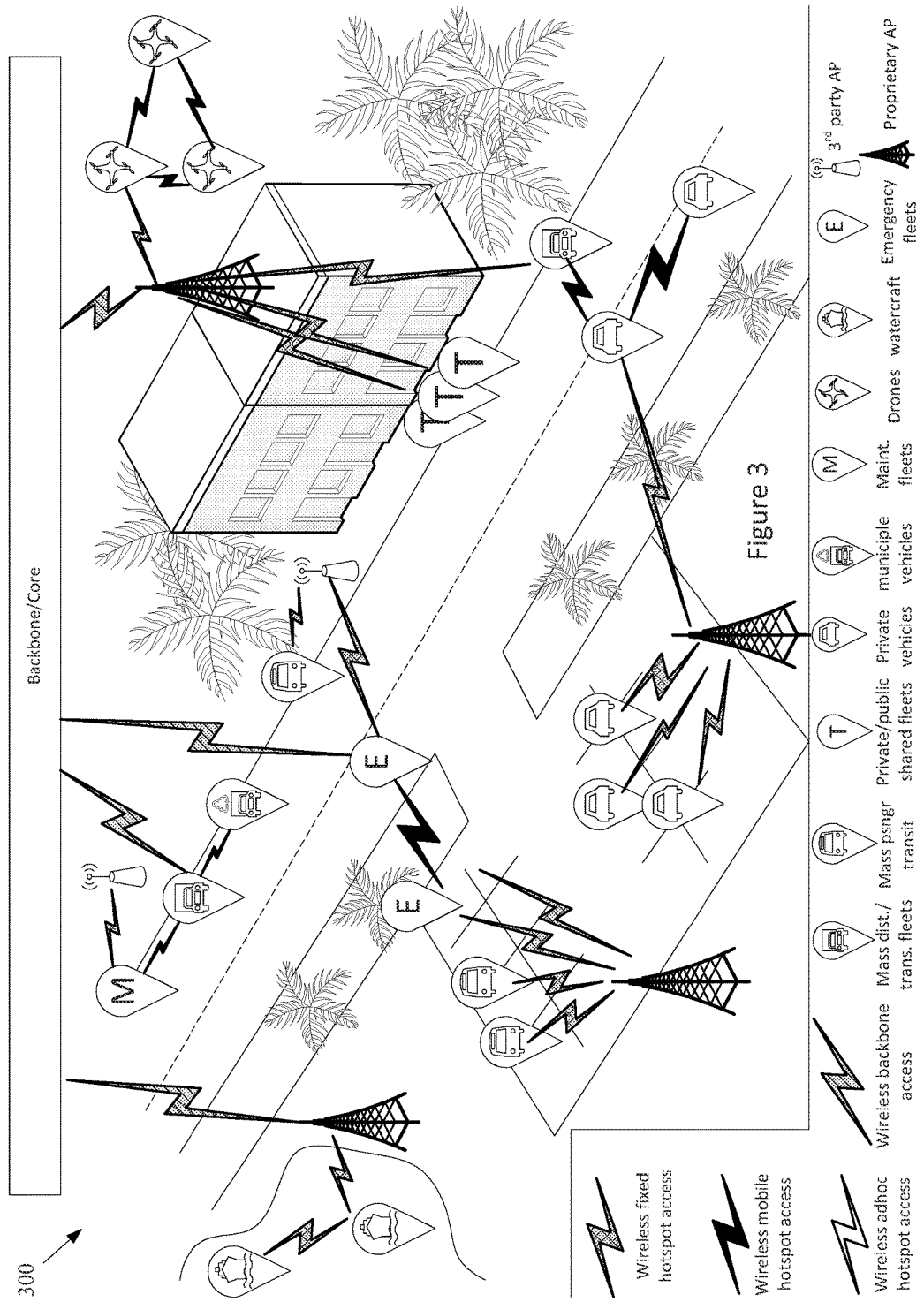
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, nodes, networks, and/or network components 100, 200, 400, 500-570, 600, 700, 800, 900, 1000, 1100, 1200, and 1300, shown and/or discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
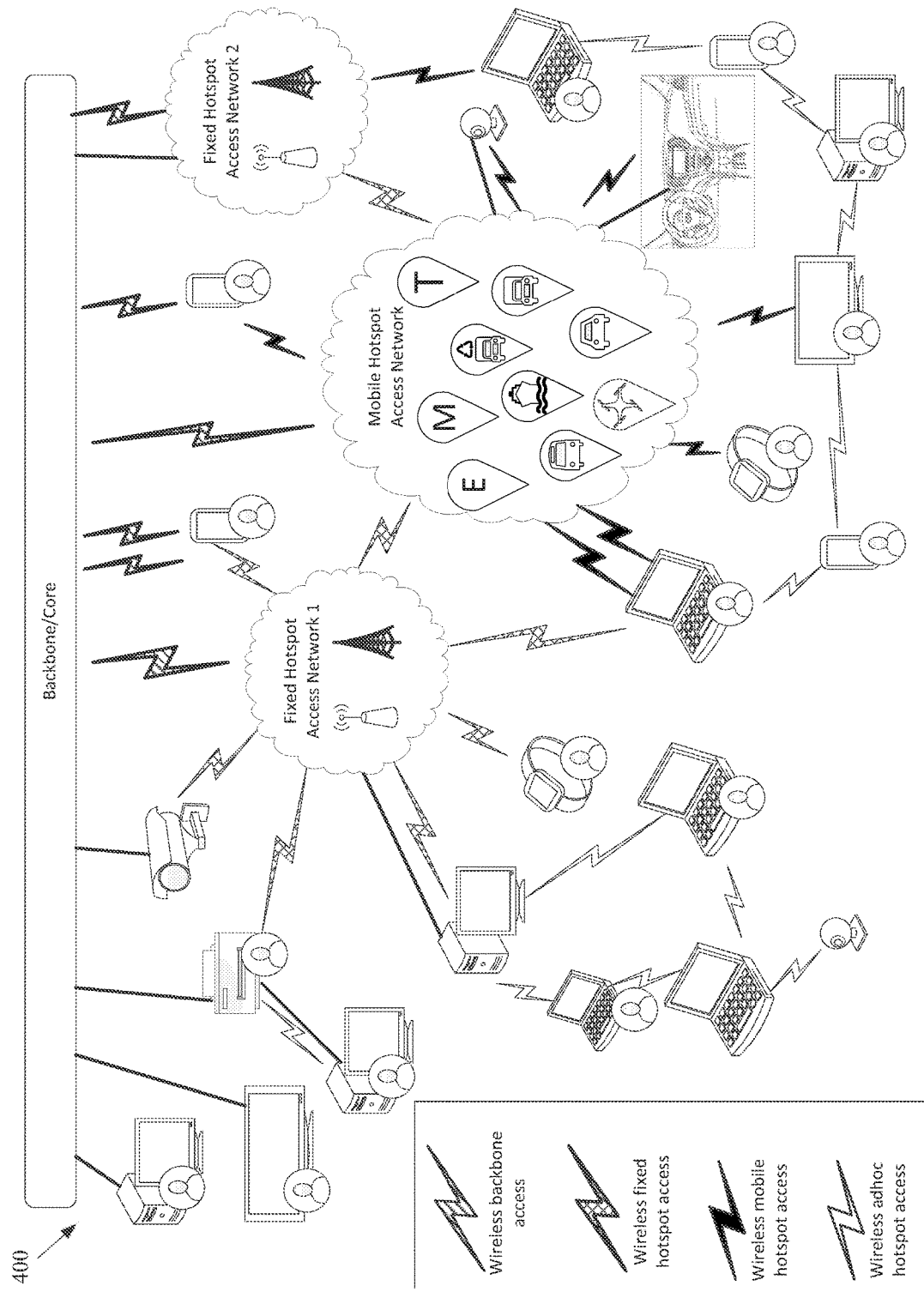
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, nodes, networks, and/or network components 100, 200, 300, 500-570, 600, 700, 800, 900, 1000, 1100, 1200, and 1300, shown and/or discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5B:
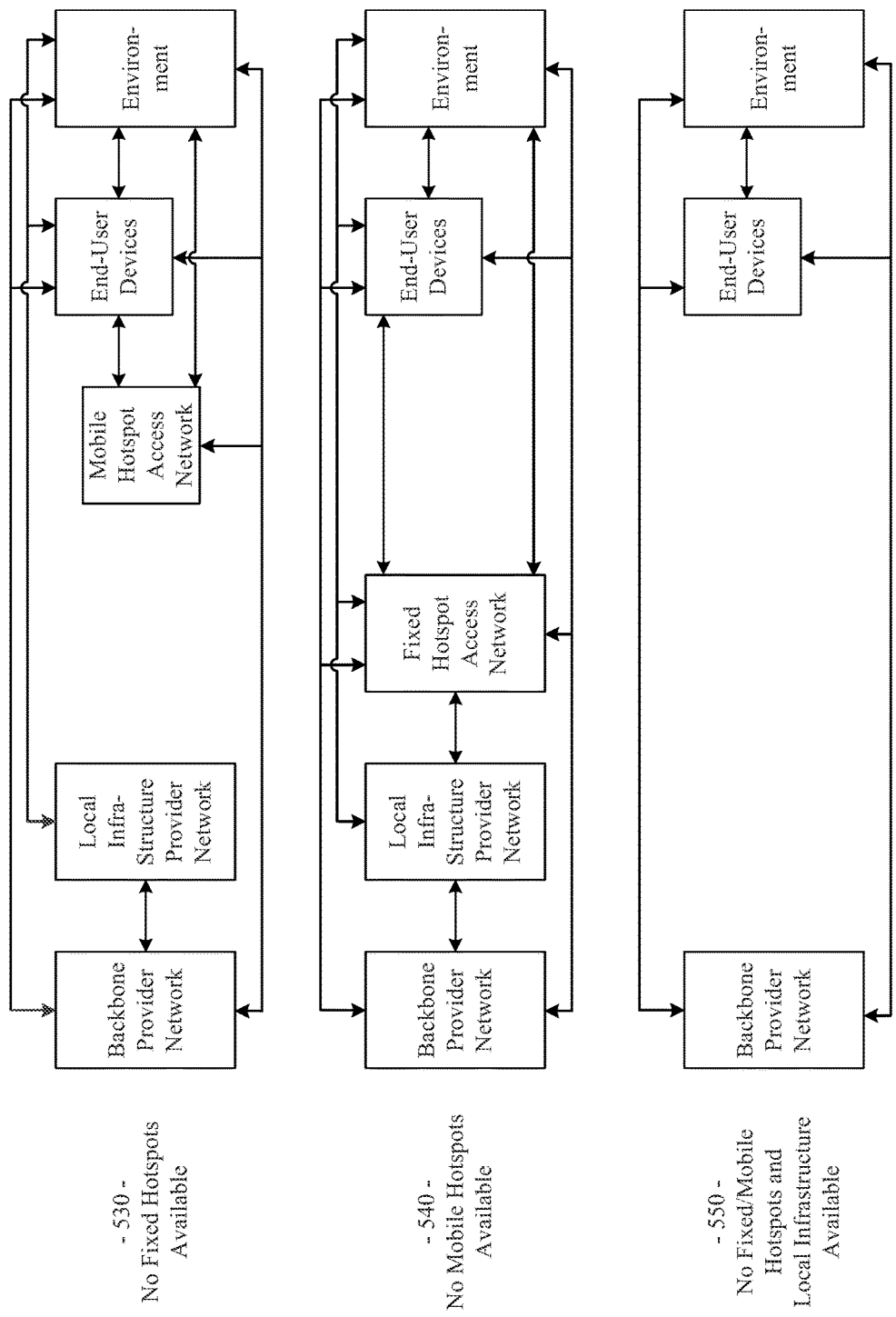
Figure 5C:
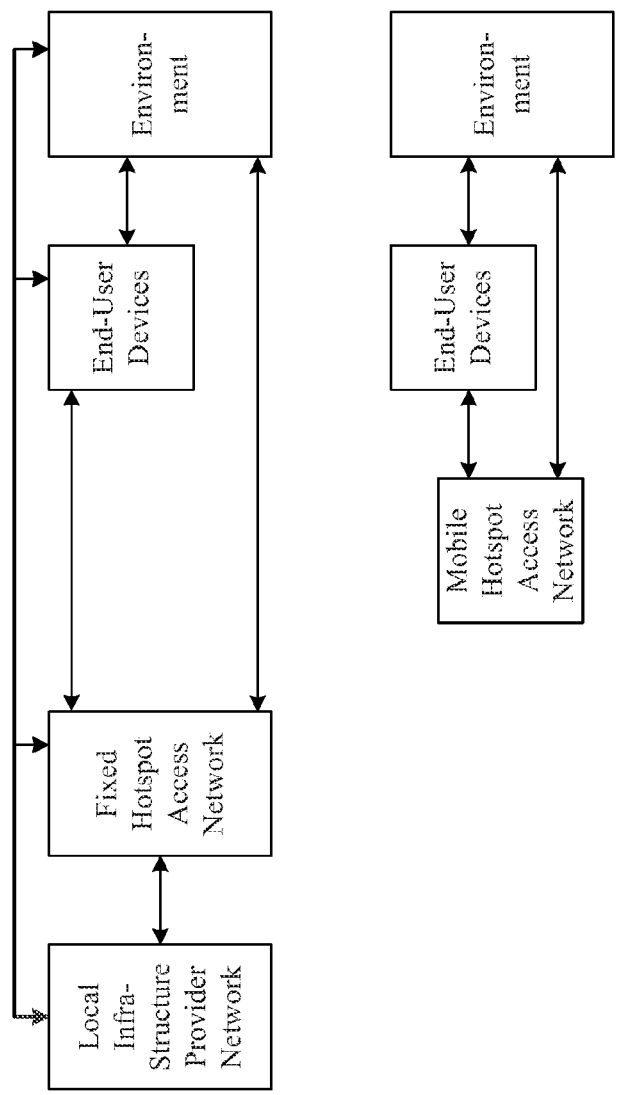

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, nodes, networks, and/or network components 100, 200, 300, 400, 600, 700, 800, 900, 1000, 1100, 1200, and 1300, shown and/or discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.).

For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
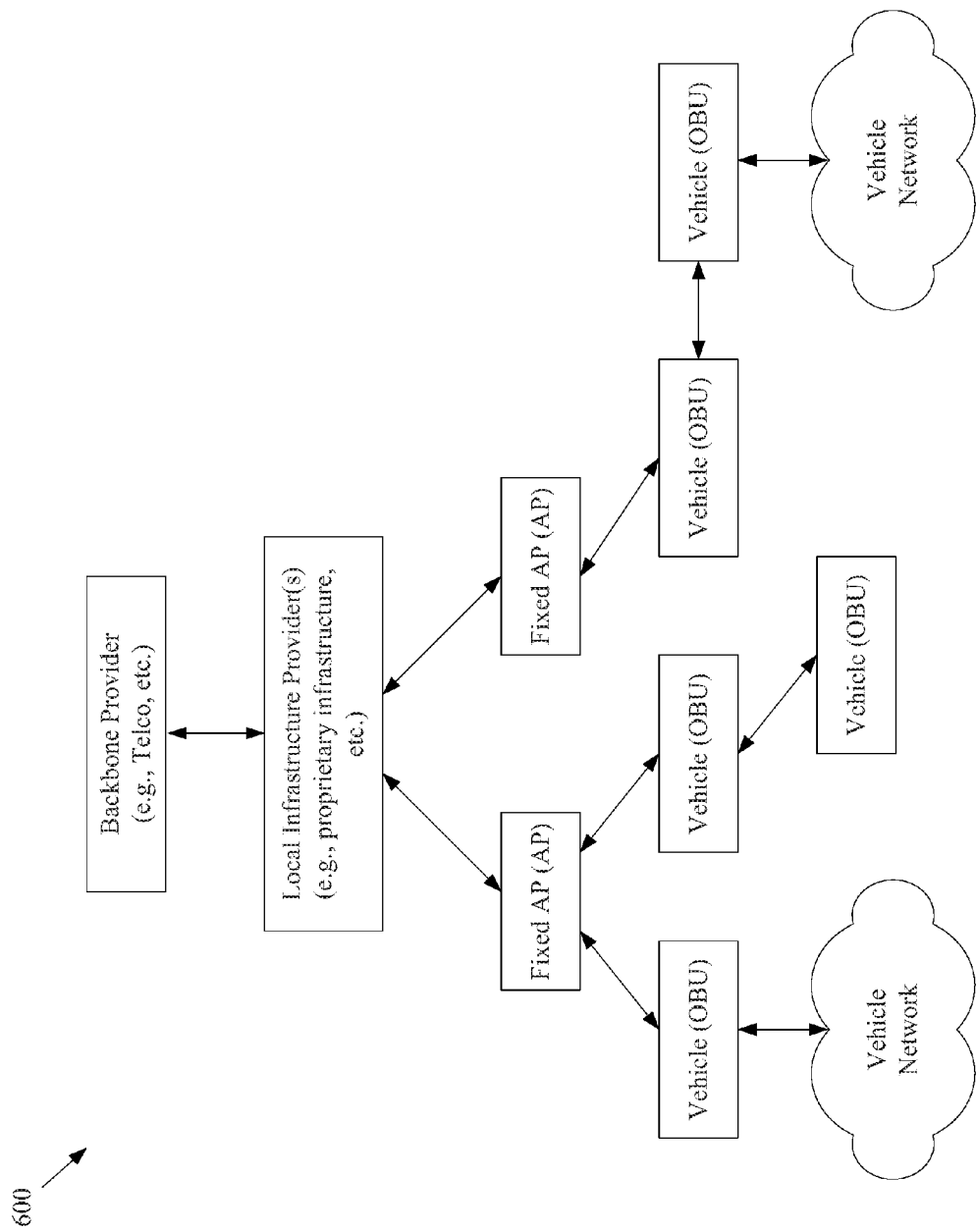
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, nodes, networks, and/or network components 100, 200, 300, 400, 500-570, 700, 800, 900, 1000, 1100, 1200, and 1300, shown and/or discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
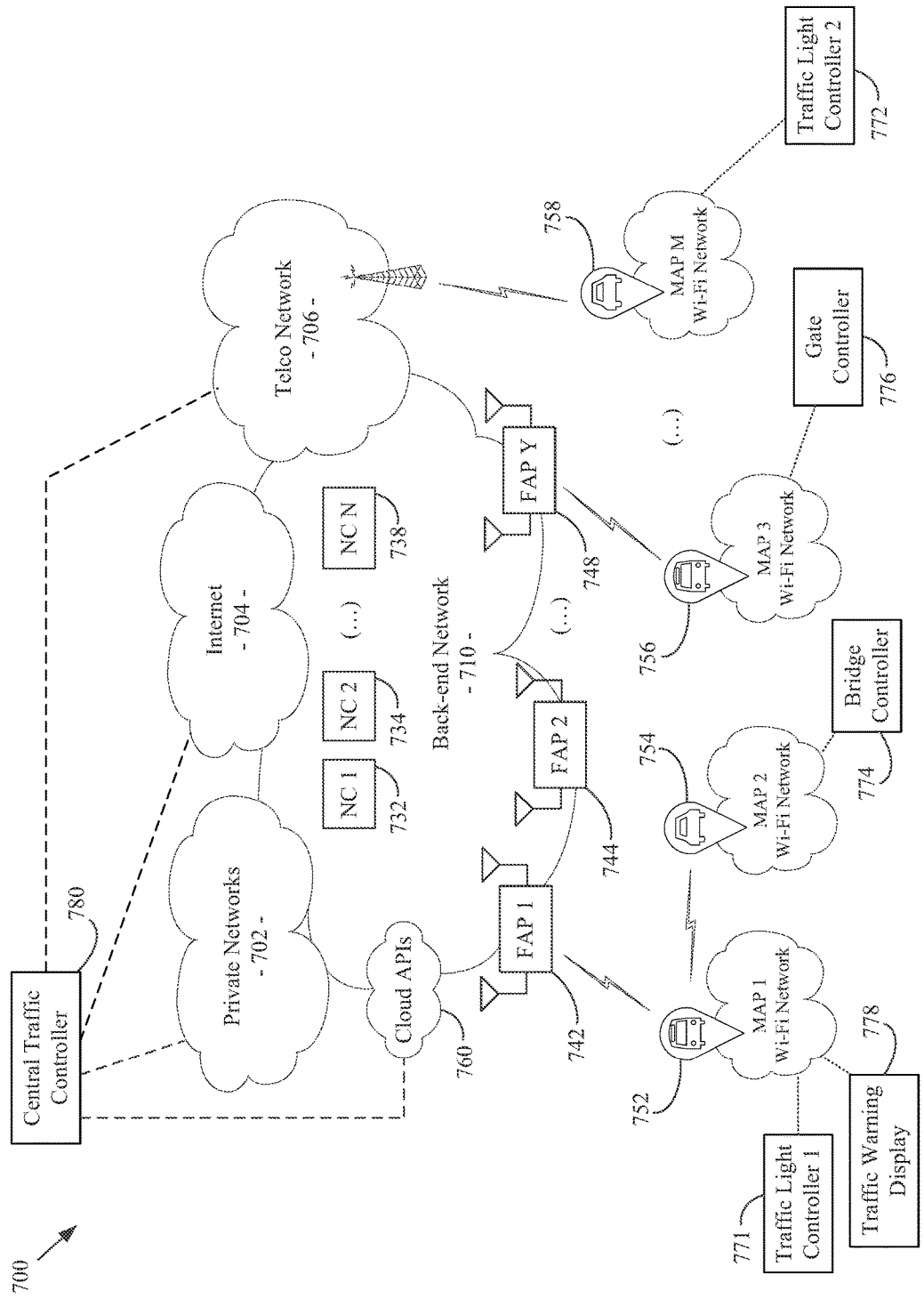
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, nodes, networks, and/or network components 100, 200, 300, 400, 500-570, 600, 800, 900, 1000, 1100, 1200, and 1300, shown and/or discussed herein. Notably, the example network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. The Mobile APs (or vehicles in which the Mobile APs are installed) may, for example, have any access to information from any of a wide array of sensors (e.g., cameras, microphones, gas or particle sensors, weather sensors, impulse sensors or accelerometers, velocity sensors, slip detectors, temperature sensors, position or location sensors, moisture detectors, pressure sensors, etc.). The Mobile APs may, for example, gather (or collect) information from such sensors, make various autonomous decisions based at least in part on the gathered information, communicate such information to controllers (e.g., local controllers, central controllers, etc.), etc. Many non-limiting examples of such operation are provided herein.

As shown in FIG. 7, a Central Traffic Controller 780 (e.g., for a city, neighborhood, precinct, etc.) may be communicatively coupled to the network (e.g., to the cloud, to the infrastructure, etc.) in any of a variety of manners. For example, the Central Traffic Controller 780 may be connected to a cloud of the network operator, for example a Back-end Network 710 (e.g., through APIs 760, via a Private Network 702, via the Internet 704, via a Telco Network 706, etc.).

Also as shown in FIG. 7, a vehicle network may be connected (e.g., communicatively coupled, directly or indirectly) to one or more local Traffic Light Controllers 771 and 772, Bridge Controllers 774, Gate Controllers 776, Traffic Warning Displays 778, etc. The vehicle network may, for example, comprise any or all of the nodes discussed herein. For example, the vehicle network may comprise one or more Network Controllers (NCs) (e.g., NC 1 732, NC 2 734, ..., NC N 738, etc.), one or more Fixed APs (e.g., FAP 1 742, FAP 2 744, ..., FAP Y 748, etc.), one or more Mobile APs (e.g., MAP 1 752, MAP 2 754, MAP 3 756, ..., MAP M 758, etc.). Such nodes may, for example, be communicatively coupled in any of the manners discussed herein.

In accordance with various aspects of the present disclosure, an appropriate balance between emergency traffic, public transportation traffic, municipal vehicle traffic, private enterprise vehicle traffic, private individual vehicle traffic, etc., may be implemented. In an example implementation, various types of vehicle traffic may be prioritized. In an example implementation, for example, emergency traffic may take priority over all other traffic. Additionally, for example, public transportation (or private mass transportation, for example shuttle buses, etc.) may take priority over private transportation. For example, even when public transportation vehicles are provided with exclusive roadway lanes, buses, shuttles, and the like may still be subject to traffic light stoppages, gate stoppages, etc. Also, even emergency service systems that may provide for control of traffic lights are inefficient and subject to inefficient or incorrect utilization or failure. Note that prioritization may also be implemented within a class of vehicle. For example, an emergency vehicle that is not operating in an emergency situation may have less priority than an emergency vehicle that is operating in an emergency situation. In an example implementation, an emergency vehicle that is not operating in an emergency situation (e.g., a law enforcement conducting routine patrol activity, a fire department vehicle traveling to a routine inspection, etc.) may be assigned a same priority as a public transportation vehicle.

Though the discussion herein will generally present various examples in a traffic light context, it should be understood that the scope of this disclosure is not limited thereto. For example, the control of any traffic control mechanism is contemplated (e.g., gate control, draw bridge control, lane opening/closing control, construction and/or warning sign control, vehicle route control, vehicle speed control, lock control, etc.).

In some cities, traffic light systems are centralized, therefore controllable from a central location that may be substantially distant from the immediate environment being controlled. In such example implementations, and in other control system architectures, the central control system may benefit from access (e.g., real-time access, near real-time access, etc.) to traffic-related information. In a network of moving things, implemented in accordance with various aspects of the present disclosure, vehicles may be equipped with Mobile APs, which in turn may communicate with numerous sensors, for example sensors of the Mobile APs, sensors of and/or mounted to the vehicle carrying the Mobile AP, sensors carried by users and/or of user devices, sensors mounted to traffic poles or buildings or buoys or other man-made structures, sensors deployed on hill tops or islands or trees or other natural structures, other apparatus, etc. Also a Mobile AP may, for example, know its location at any point in time. Thus, the network of moving things may be utilized to provide real-time information of traffic conditions, and/or sensed events that may affect traffic and/or traffic control. The network may, for example, provide any or all of such sensor information to one or more traffic control systems (e.g., one or more centralized traffic control systems, one or more distributed traffic control systems, any combination thereof, etc.).

In an example implementation, a fleet of vehicles (e.g., buses, municipal maintenance vehicles, emergency vehicles, trains, taxis, etc.), or Mobile APs thereof, may act as traffic sensors, for example collecting and/or uploading traffic condition metrics to the cloud (e.g., to a central traffic controller, to a database accessible to one or more traffic controllers via APIs, etc.). The traffic controller may then process the traffic-related information from multiple vehicles to determine traffic conditions. Based on such determined traffic conditions, the traffic controller may take action to manage traffic efficiently, for example to alleviate congestion, to prioritize movement (or travel) of emergency vehicles (or emergency vehicles operating in an emergency situation) and public transportation vehicles (or public transportation vehicles operating behind schedule), to dispatch vehicles to alleviate obstructions to traffic flow, etc.

The traffic control functionality discussed herein may be centralized, but may also be distributed or managed locally, for example with the vehicle (or Mobile AP) providing the same information to local traffic control systems (e.g., a traffic light controller, a train gate controller, a bridge controller, a programmable traffic control sign, etc. Such local traffic control systems may, for example, control a single light, gate, etc., may control a synchronized set of such devices at a single respective intersection, etc.

In an example implementation, cameras may be mounted to vehicles to monitor traffic. For example, one or more cameras (e.g., forward looking, rear looking, side looking, etc.) may be utilized to acquire traffic and/or traffic-related information, which may then be provided to traffic control systems (e.g., central traffic control systems, local traffic control systems, etc.).

Various aspects of the present invention may, for example, comprise providing traffic light sensing in the network, traffic light advertisement through the cloud, distributed traffic control, information delivery from the physical network to the central traffic controller, information delivery from the cloud (e.g., a private cloud of the network operator, a public cloud, the Internet, etc.) to the central traffic controller, controlling (or acting on) traffic lights, etc.

For example, in an example implementation, a Mobile AP of a vehicle may collect information from sensors of the Mobile AP, from the vehicle or sensors of the vehicle, from sensors around the Mobile AP or vehicle, etc. Mobile and Fixed APs may, for example, coordinate with each other, so that as soon as a Mobile AP receives information that a traffic light is nearby (e.g., a wireless sensor, which is detectable by the Mobile AP, can be connected to (or nearby) the traffic light), the Mobile AP may advertise (e.g., periodically, continually, etc.) the presence of the traffic light in the network. The information about the presence of the traffic light and/or its state (e.g., color, etc.) may then be spread in the network (e.g., throughout the network, in a geographical region in which the traffic light is relevant, etc.). Thus, any vehicle of interest (e.g., a high-priority vehicle, a medium-priority vehicle, a typical vehicle, etc.) can know in advance that it is approaching a traffic light and/or know the traffic light's state.

In an example scenario in which the information of the traffic light locations is (or is only) available in the cloud, a cloud system may periodically inspect the real-time locations of the vehicles of interest, which may also be referred to herein as priority vehicles (e.g., high priority vehicles, medium priority vehicles, etc.), which may be constantly received from every vehicle, and detect if any is approaching a traffic light.

Various aspects of the present disclosure provide a distributed traffic controller system, for example in which a respective portion of the distributed traffic controller system (e.g., a distributed control unit) is installed on each Mobile AP. For example, the Mobile AP installed on a high-priority vehicle may pre-process and quickly send the information to the traffic light controller system (or portion thereof) that may be available on each priority vehicle. In this example implementation, the in-vehicle distributed control unit can quickly contact its central controller system, for example using its own control messaging, without having to communicate via intermediate cloud systems. If it is not required to contact the central controller system, the Mobile AP (or distributed control unit thereof) installed on the priority vehicle may for example begin transmitting, in the vehicular network, the instruction (or command) to control (or act on) the traffic light, and thus the control instruction (or command) may efficiently reach the traffic light before the priority vehicle. Such a distributed system may, for example, be capable of acting with a substantially lower latency than a centrally controlled system with which communication occurs via the cloud.

In various example implementations, information may be delivered from the network of moving things to a centralized traffic controller. For example, the communication between a distributed control unit installed on the priority vehicle (e.g., installed in the Mobile AP, installed in the vehicle but separate from the Mobile AP, etc.) and the central controller system can be performed utilizing the network of moving things, many examples of which are disclosed herein, to deliver the information to the cloud. An example communication pathway from a first vehicle (or first Mobile AP) to a first Fixed AP to the Cloud to the central traffic controller is shown in the example network 800 of FIG. 8, which shows a block diagram of an example communication network, in accordance with various aspects of the present disclosure. The example network 800 may, for example, share any or all characteristics with the other example methods, nodes, networks, and/or network components 100, 200, 300, 400, 500-570, 600, 700, 900, 1000, 1100, 1200, and 1300, shown and/or discussed herein.

In various example implementations, the traffic information may be stored in one or more databases 890 in the Cloud 815, for example in a raw format, or various metrics may be derived, as requested by the Central Traffic Controller 880. For example, the Central Traffic Controller 880 may periodically access the Cloud 815 (or database 890 thereof) (e.g., through specific Cloud APIs, etc.) to gather the information (e.g., in a solicited, or pull, manner), or the information can be sent directly to the Central Traffic Controller 880 without waiting for a request (e.g., in an unsolicited, or push, manner). The example network 800 may, for example, provide the capability for the Central Traffic Controller 880 to communicate directly with a Second Traffic Light Controller 872 (or any traffic light controller), for example via a backbone network such as a cellular communication network, etc. The example network 800 may also, for example, provide the capability for the Central Traffic Controller 880 to communicate with a First Traffic Light Controller 871 (or any traffic light controller) via various nodes of a vehicle communication network (e.g., via the First FAP 842, First Vehicle 852 or MAP thereof, etc.). The example network 800 may also, for example, provide the capability for the Central Traffic Controller 880 to communicate with a Second Vehicle 856 (or MAP thereof) via a Second FAP 848. In general, the Central Traffic Controller 880 may communicate with a traffic light controller via any of the communication pathways discussed herein.

Note that the communication pathway(s) selected for communication between a central traffic controller (or distributed traffic controller) and traffic light control circuitry may be specified in a configuration profile and may be adaptable in real-time. For example, in an emergency situation, a central traffic controller (or distributed traffic controller) may communicate with a local traffic light controller via a cellular network as the central traffic controller assists with the movement of an emergency vehicle in an emergency situation. Also for example, as the central traffic controller assists with the movement of the same emergency vehicle during non-emergency operation, the central traffic controller may communicate with the local traffic light controller via the vehicle communication network. In another example scenario, the central traffic controller may (e.g., for a particular type of vehicle, for example a public transportation vehicle) be configured to always communicate with local traffic control systems via the vehicle network, or to always communicate via the vehicle network unless in a failover situation.

In an example implementation, the Central Traffic Controller 880 may directly control the traffic lights (e.g., through a direct proprietary communication link, through a direct cellular communication link, through a direct terrestrial wired communication link, etc.), or alternatively, if the traffic lights are not directly connected with the Central Traffic Controller 880, the control information may be sent to the priority vehicle of interest (or a MAP thereof) using the network of moving things to transport the information. In this second case, the Mobile AP installed on the priority vehicle may then communicate with the local traffic light controller through wireless communication (e.g., via Wi-Fi, via 802.11p or DSRC, via a proprietary wireless technology dedicated to traffic light control, etc.) to control (or act on) the traffic light. Traffic light control instructions (or commands) may thus be communicated to the traffic light before the priority vehicle reaches the traffic light. Such a communication link via the network of moving things is shown by example in the middle branch of FIG. 8 (e.g., from the Central Traffic Controller 880 via the Cloud 815, First Fixed AP 842, First Vehicle 852 (or MAP thereof), and to the first local Traffic Light Controller 871. Though not shown, as discussed herein, a plurality of vehicles (or MAPs thereof) may be incorporated into the chain of communication (e.g., upstream and/or downstream of the First Vehicle 852). A communication link from the Central Traffic Controller 880 to the second local Traffic Light Controller 872, which does not utilize the network of moving things, is shown at the right branch of FIG. 8 (e.g., from the Central Traffic Controller 880 via an alternative backbone network, for example cellular or landline). Such communication may, for example, be performed via any of a variety of networks (e.g., via a dedicated traffic control network, via a telecom link, etc.).

Figure 8:
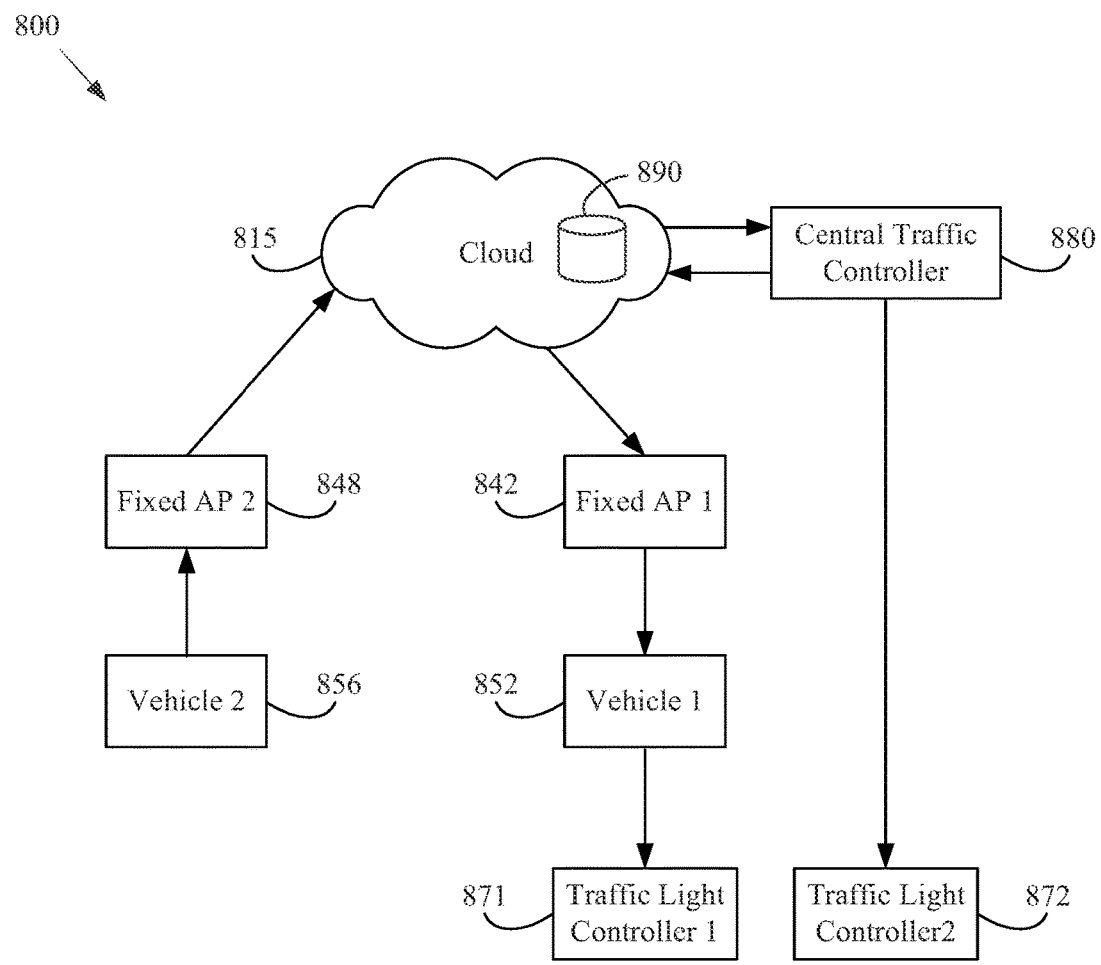
FIG. 8 shows a block diagram of an example communication network, in accordance with various aspects of the present disclosure.

As also shown in FIG. 8, information gathered from the Second Vehicle 856 (e.g., traffic situation information, sensor information, etc.), or MAP thereof, may be communicated to the Central Traffic Controller 880 (or to a cloud database 890) via the Second Fixed AP 848, Cloud 815, etc.). Note that, although the communication links in the example network 800 shown in FIG. 8 are shown as one-way links, this is for illustrative purposes and is by no means limiting. For example, any or all of the communication links may be multi-way communication links. For example, the local Traffic Light Controllers 871 and 872 may communicate information (e.g., sensor information, control information, protocol handshaking information, security information, etc.) to the Central Traffic Controller 880 or database 890. Similarly, the Central Traffic Controller 880 may communicate information to the Second Vehicle 856 (e.g., requesting traffic information, sensor readings, requesting more information about a detected traffic event, etc.).

Figure 9:
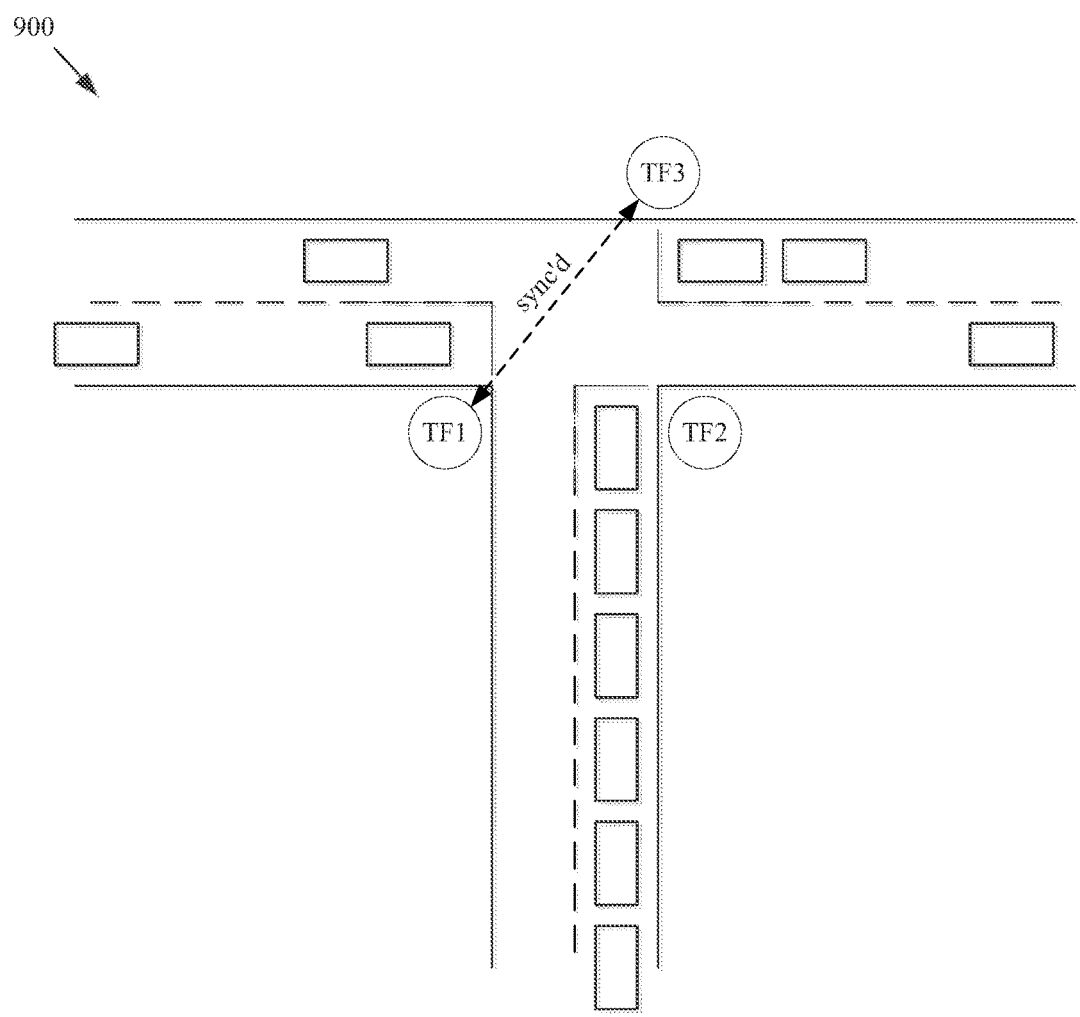
FIG. 9 shows a block diagram of an example traffic control scenario, in accordance with various aspects of the present disclosure.

An example traffic control scenario is illustrated at FIG. 9. The example traffic control scenario 900 (e.g., of networked vehicles and/or sensors and/or traffic control systems, etc.) may, for example, be managed utilizing any or all of the example networks and/or network components (including functional aspects) 100, 200, 300, 400, 500-570, 600, 700, 800, 900, 1000, 1100, 1200, and 1300, shown and/or discussed herein.

In the example scenario 900, TF1, TF2, and TF3 are traffic lights, and TF1 and TF2 are synchronized to each other. Also, in accordance with various aspects of this disclosure, at least some of the vehicles are equipped with sensors and communication technology by which they may communicate with the traffic lights. Note that such communication technology may comprise a Mobile AP (e.g., utilizing Wi-Fi technology, other Wireless LAN technology, 802.11p technology, etc.) but may also comprise a separate radio with different technology (e.g., utilizing a proprietary communication protocol for traffic light communication, etc.).

In the example scenario, as the vehicles move and send data to the traffic lights (e.g., via a single-hop link, via a multi-hop link, via a mesh network, etc.) the traffic lights are able to understand that the road where TF3 is placed has much higher traffic and so TF3 can increase the time that TF3 spends in a "green light" state, increasing as well the amount of time that cars controlled by TF2 and TF1 have to spend waiting for the green light. In this example scenario, the data collected by the vehicles need not reach the Cloud before such data is used to control traffic. In another example scenario, the sensor data may be communicated to the Cloud (e.g., via the vehicle communication network, via the cellular network, etc.), and a central traffic controller may then control the lights (e.g., via the vehicle communication network, via the cellular network, etc.).

A traffic control system implemented in accordance with the present disclosure may provide any one or more of a variety of benefits. For example, such a system may improve traffic management in a city, such a system may provide the flexibility for city managers to promote public transportation by optimizing or emphasizing its efficiency, such a system may provide additionally safety for public transportation and/or for emergency vehicles, such system may provide for efficient installation of controllable traffic lights (or other traffic control devices) without the need for expensive dedicated networking, etc.

In accordance with various aspects of this disclosure, the network of moving things may provide information of detected passenger count, for example providing a picture of the true throughput of a public transportation system, for example as opposed to vehicle counting. For example, in an example implementation, small cameras may be coupled to small single-board computers (SBCs) and placed above the doors of public buses to facilitate capturing images of people entering and leaving buses. Such cameras may also be installed at several stops along the bus routes, for example to provide information of the number of people waiting for a bus. Such data may, for example, be gathered by the Mobile AP and sent to the Cloud. With such data, authorities may detect passenger peaks and lulls, detect overcrowded and/or underutilized buses, modify bus routes, move bus stops, etc. At least some of such modifications may, for example be performed in real-time (e.g., reduce bus periodicity to decrease fuel costs and $CO_2$ emissions when passenger flows are smaller, etc.). The information may also be utilized to detect and/or predict systematic transportation problems, etc. For example, detected conditions may be statistically correlated with future traffic flow issues, such that traffic flow may be controlled in a proactive manner.

In an example implementation, the system discussed herein may be integrated with navigation systems, for example providing for the real-time sensed data to be directly integrated with the local navigation device installed inside the vehicle and/or to be sent to the public/private navigation system operating at the Cloud and ultimately accessed by the end-user device. Such an implementation may, for example, help the navigation system quickly and automatically detect traffic jams and give alternative route guidance. Such real-time sensed data may, for example, be combined with various user-based and/or GPS-based traffic monitoring systems. Additionally, as discussed herein, the Mobile AP may communicate with sensors on-board the vehicle, but may also communicate with sensors that are outside the vehicle (e.g., fixed location sensors, sensors attached to other vehicles, etc.).

In an example implementation, on-board sensors may also be utilized to facilitate accident detection and/or reporting, in addition to enhancing response time as discussed herein. In another example implementation, the network of moving things may also be integrated with systems (e.g., public and/or private systems) that manage ticketing, fare payment, tolling, parking, etc. In an example implementation in which a vehicle has a separate device installed to participate in such activities, the network of moving things as discussed herein (e.g., the Mobile AP) may communicate with such separate device (e.g., via Wi-Fi, via Bluetooth, via wired link, etc.).

Various aspects of the present disclosure generally concern operation of one or more nodes of a communication network (e.g., a Mobile AP, a Fixed AP, etc.). Various examples of such operation will now be presented in the context of an example method that may be implemented in a Mobile AP, but the scope of the disclosure is not limited thereto. For example, any or all of the aspects may be performed in any of the communication network nodes discussed herein, autonomously or in a distributed manner among a plurality of such nodes.

Figure 10:
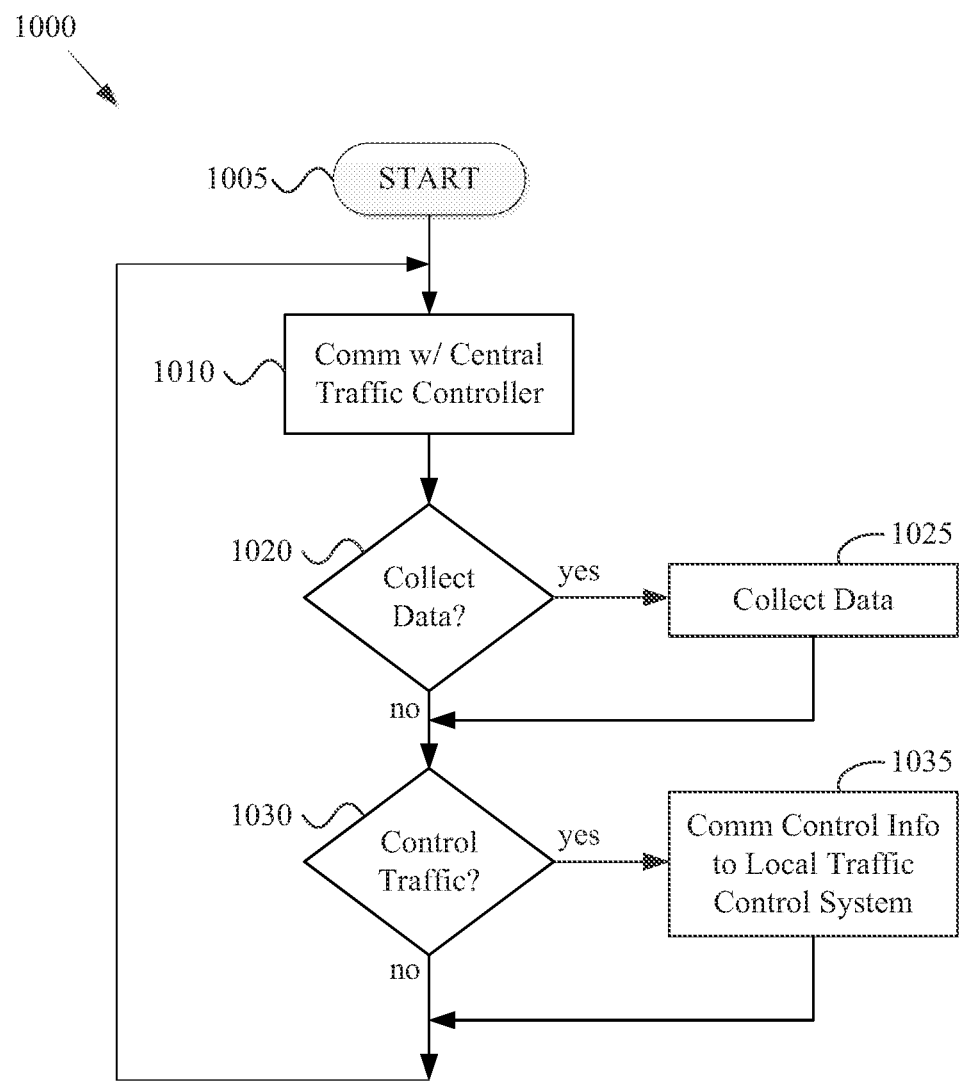
FIG. 10 shows a flow diagram of an example method of managing traffic, in accordance with various aspects of the present disclosure.

FIG. 10 shows a flow diagram of an example method 1000 of managing traffic, in accordance with various aspects of the present disclosure. The example method 1000 may, for example, share any or all characteristics with the other example methods, nodes, networks, and/or network components 100, 200, 300, 400, 500-570, 600, 700, 800, 900, 1100, 1200, and 1300, shown and/or discussed herein.

The example method 1000 begins executing at block 1005. The example method 1000 may begin executing in response to any of a variety of causes or conditions, non-limiting examples of which are provided herein. For example, the example method 1000 may begin executing in response to a user command to begin, in response to a signal received from a network node, in response to a detected traffic condition, in response to a detected emergency condition, in response to a timer, in response to power-up (or turn on) event at the system implementing any or all aspects of the example method 1000, etc.

At block 1010, the example method 1000 comprises communicating with a central traffic controller regarding traffic control. Such communication may comprise any of a variety of characteristics. For example, block 1010 may comprise receiving information from the central traffic controller concerning how the Mobile AP is to conduct its data collection activities (e.g., data collection control information). For example, such information may comprise information concerning sensors with which the Mobile AP is to communicate to obtain sensor information (e.g., sensor geographical location, sensor network address, sensor type, etc.). Also for example, such information may comprise information identifying when the Mobile AP is to collect (or gather) data from various sensors. Additionally, for example, such information may comprise information regarding the manner in which the Mobile AP is to communicate collected data to the central traffic controller (or database(s) accessed thereby). For example, such information may indicate whether data collected from a sensor is to be communicated immediately (e.g., via a cellular network, via the vehicle network, etc.), whether the data is to be communicated within a particular amount of time (e.g., within a number of seconds, within a number of minutes, etc.), whether the data has a higher priority than other data, etc.

The information received from the traffic controller may also, for example, comprise traffic control command information. As discussed herein, a central traffic controller may communicate control commands to local traffic control systems (e.g., to a controller of a traffic light or set thereof, to a controller of a gate, to a controller of a bridge, to a controller of a programmable traffic sign, etc.). Such commands may, for example, be originated by the central traffic controller and communicated through one or more Mobile APs and/or Fixed APs. In an example scenario, a central traffic controller may communicate a "green light" command through a Mobile AP that is within communication range of the local traffic light control system capable of implementing the "green light." In another example scenario, the central traffic controller may communicate a "close gate" command for a particular traffic control gate to the vehicle communication network, which then has the responsibility to propagate the command to the particular traffic control gate through one or access points (e.g., FAPs, MAPs, etc.) that are geographically close to the particular traffic control gate.

In general, block 1010 may comprise the Mobile AP communicating with a central traffic controller regarding traffic control. Accordingly, the scope of this disclosure should not be limited by characteristics of any particular manner of such communicating, any particular type of information related to traffic control, etc.

At block 1020, the example method 1000 comprises determining whether data (e.g., sensor data) is to be collected. Such collecting may be triggered by a command from the central traffic controller, the geographical location of a sensor and/or of the Mobile AP, the geographical location of an intersection and/or of the Mobile AP, a detected beacon associated with a sensor or location, a timer, a user command, a detected traffic condition (e.g., a detected accident, traffic jam, emergency situation, etc.), a predetermined schedule, etc.

If it is determined at flow control block 1020 that data is to be collected, then execution of the example method 1000 flows to block 1025. If it is determined at flow control block 1020 that data is not to be presently collected, then execution flow of the example method 1000 flows to block 1030.

At block 1025, the example method 1000 comprises collecting data (e.g., data that may be utilized by the central traffic controller to make traffic control (or management) decisions). Block 1025 may comprise collecting data from any of a variety of sensors, non-limiting examples of which are provided herein. For example, block 1025 may comprise collecting data from sensors (or systems) on-board the vehicle carrying the Mobile AP (e.g., speed sensors, weight sensors, shock/vibration sensors, emission sensors, gas particle sensors, temperature sensors, cameras, microphones, travel distance sensors, location sensors, orientation sensors, fuel gauge sensors, engine sensors, rain sensors, wind sensors, passenger-counting sensors, passenger payment sensors, etc. Block 1025 may also, for example, comprise collecting data from any of such sensors that are external to the vehicle carrying the Mobile AP. Block 1025 may, for example, comprise receiving such data collected by other Mobile APs, user devices, Fixed APs, etc.

Block 1025 may comprise collecting the data in any of a variety of manners, non-limiting examples of which are provided herein. For example, block 1025 may comprise collecting the data from an on-board diagnostic (OBD) system of the vehicle carrying the Mobile AP (or from the OBD systems of other vehicles). Also for example, block 1025 may comprise communicating with various sensors on-board the vehicle utilizing wired, optical, and/or wireless communication protocols. Additionally for example, block 1025 may comprise communicating with various sensors that are not on-board the vehicle utilizing wireless communication protocols (e.g., Wi-Fi, 802.11p, Bluetooth, etc.).

In general, block 1025 may comprise collecting data (e.g., data that may be utilized by the central traffic controller to make traffic control (or management) decisions). Accordingly, the scope of this disclosure is not limited by characteristics of any particular type of data or sensor, manner of data collecting, etc. After block 1025, execution of the example method 1000 flows to block 1030.

At block 1030, the example method 1000 comprises determining whether a traffic control operation is to be performed. Such controlling may, for example, be triggered by a command from the central traffic controller, by a user command, by a detected traffic condition, etc. Also note that, as discussed herein, one or more aspects of the central traffic controller may be implemented on-board one or more Mobile APs and/or other nodes of the network. Accordingly, such controlling may be triggered by a module (or portion thereof), for example a distributed traffic control unit, of the Mobile AP that performs traffic control decisions. For example, as discussed herein, any or all of the central traffic control functions may be performed in one or more Mobile APs (e.g., individually and/or in a distributed or mesh manner).

If it is determined at flow control block 1030 that traffic control is to be performed, then execution of the example method 1000 flows to block 1035. If it is determined at flow control block 1030 that traffic control is not to be presently performed, then execution flow of the example method 1000 flows to block 1010 for continued operation.

At block 1035, the example method 1000 comprises communicating control information to one or more local traffic control systems (e.g., to a controller of a traffic light or group thereof, to a local controller of a gate, to a local controller of a bridge, to a local controller of a programmable traffic sign, etc.). Block 1035 may comprise communicating such control information (e.g., control commands, etc.) in any of a variety of manners, non-limiting examples of which are provided herein.

For example, block 1035 may comprise utilizing the native wireless communication capability of the Mobile AP (e.g., Wi-Fi, 802.11p, Bluetooth, cellular, etc.) to communicate directly with the local traffic control system(s) to be controlled. Also, for example, block 1035 may comprise utilizing the vehicle network infrastructure, other Mobile APs, etc., to communicate with the local traffic control system(s) to be controlled. Additionally, for example, block 1035 may comprise utilizing a communication system independent of the Mobile AP (e.g., a traffic light controller communication system that is on-board the vehicle and communicatively coupled to the Mobile AP, etc.).

Block 1035 may, for example, comprise forming a secure communication link with the local traffic control system prior to communicating the control information. Information regarding the establishment of such a link may, for example, be received at block 1010. Such information may, for example, comprise any of a variety of types of authentication and/or encryption/decryption information.

In general, block 1035 comprises communicating control information to one or more local traffic control systems. Accordingly, the scope of this disclosure should not be limited by characteristics of any particular control information or of any particular manner of communicating such control information.

From block 1035, execution of the example method 1000 flows back up to block 1010 for continued execution. Note that execution may flow to any of the blocks of the example method 1000 or any portion thereof. Also note that execution may flow to any of the blocks (or steps or functions) of any of the example methods discussed herein.

Figure 11:
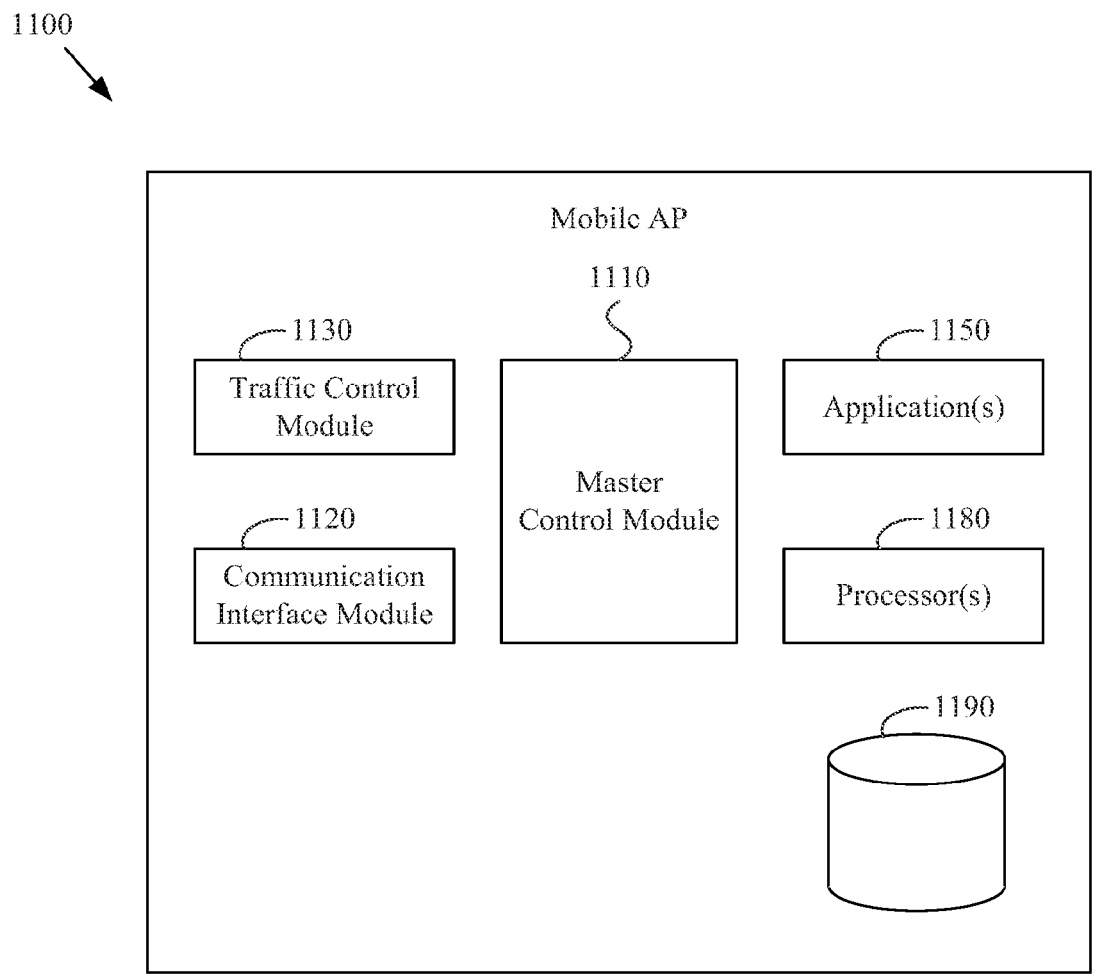
FIG. 11 shows a block diagram of an example mobile access point, in accordance with various aspects of the present disclosure.

FIG. 11 shows a block diagram of an example mobile access point, in accordance with various aspects of the present disclosure. The example Mobile AP 1100 may, for example, share any or all characteristics with the other example methods, nodes, networks, and/or network components 100-1000, 1200 and 1300, discussed herein. For example, any or all of the components of the example Mobile AP 1100 may perform any or all of the method steps presented herein, for example with regard to a Mobile AP. Note that the Mobile AP 1100 may also be referred to herein as an OBU.

The example Mobile AP 1100 may, for example, comprise a Communication Interface Module 1120 that operates to perform any or all of the wireless and/or wired communication functionality for the Mobile AP 1100, many examples of which are provided herein (e.g., communication with central traffic controllers, communication with cloud databases, communication with sensors, communication with local traffic control systems, communication with NCs, communication with Fixed AP nodes, communication with Mobile AP nodes, communication directly with client devices, backhaul or cellular communication, etc.). The Communication I/F module 1120 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a Mobile AP and an NC, between a Mobile AP and a Fixed or Mobile AP, between a Mobile AP and a local traffic control system, between a Mobile AP and a cloud database, between a Mobile AP and a central traffic controller, etc., may be performed utilizing the Communication Interface Module 1120.

The example Mobile AP 1100 also comprises a Traffic Control Module 1130 that, for example, operates to perform any or all of the traffic control functionality discussed herein (e.g., with regard to the example method 1000 of FIG. 10, with regard to the traffic control functionality discussed herein with regard to FIGS. 7-9 and FIG. 12, etc.). The Traffic Control Module 1130 may, for example, utilize communication services provided by the Communication Interface Module 1120 to perform various aspects of communication.

The example Mobile AP 1100 may, for example, comprise a Master Control Module 1110 that generally manages operation of the Mobile AP 1100 at a high level. Such Master Control Module 1110 may, for example, comprise various aspects of an operating system for the Mobile AP 1100.

The example Mobile AP 1100 may further, for example, comprise one or more Applications 1150 executing on the Mobile AP 1100 (e.g., traffic control applications, sensor interface applications, client management applications, security applications, power management applications, vehicle monitoring applications, location services applications, user interface applications, etc.).

The example Mobile AP 1100 may also comprise one or more Processors 1180 and Memory Devices 1190. The Processor(s) 1180 may, for example, comprise any of a variety of processor characteristics. For example, the Processor(s) 1180 may comprise one or more of a general purpose processor, RIS processor, microcontroller, ASIC, DSP, video processor, co-processor, etc. The Memory Device(s) 1190 may, for example comprise any of a variety of memory characteristics. For example, the Memory Device(s) 1190 may comprise a volatile memory, non-volatile memory, etc. The Memory Device(s) 1190 may, for example, comprise a non-transitory computer-readable medium that comprises software instructions that when executed by the Processor(s) 1180, cause the Mobile AP 1100 to perform any or all of the functionality discussed herein (e.g., mobility management functionality, communication functionality, etc.).

Note that the example Mobile AP 1100 may also be a Fixed AP 1100 (or base station), in which case, the modules operate to perform any or all of the functionality discussed herein with regard to fixed access points and/or base stations. Also note that the example Mobile AP 1100 may be implemented in any of the communication network nodes discussed herein (e.g., cloud nodes, backbone network nodes, vehicle network nodes, client or user devices, etc.).

Various aspects of the present disclosure generally concern operation of one or more nodes of a communication network (e.g., a central traffic controller, a cloud server, etc.). Various examples of such operation will now be presented in the context of an example method that may be implemented in a central traffic controller (e.g., implemented in a cloud-based server or computing system), but the scope of this disclosure is not limited thereto. For example, any or all of the aspects may be performed in any of the communication network nodes discussed herein, autonomously or in a distributed manner among a plurality of such nodes (e.g., in one or more Network Controller nodes, in one or more Fixed APs, in one or more Mobile APs, in one or more client or user devices, any combination of such nodes, etc.).

Figure 12:
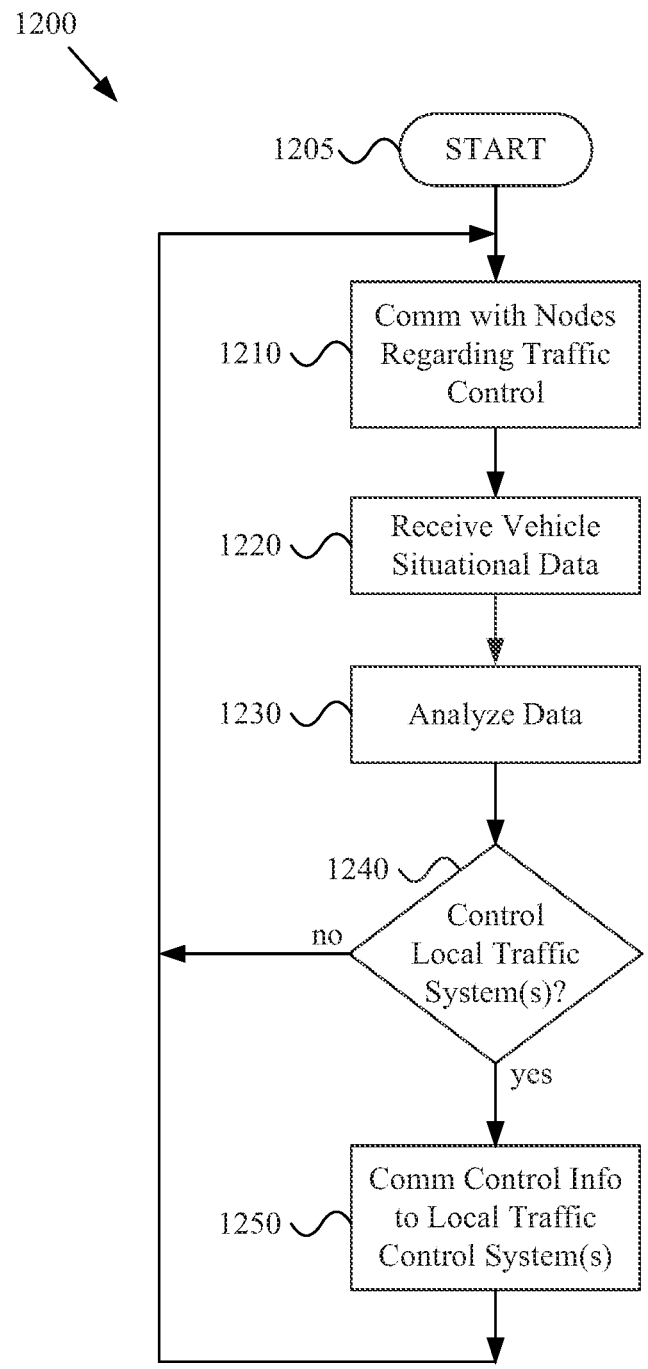
FIG. 12 shows a flow diagram of an example method of managing traffic, in accordance with various aspects of the present disclosure.

FIG. 12 shows a flow diagram of an example method 1200 of managing traffic, in accordance with various aspects of the present disclosure. The example method 1200 may, for example, share any or all characteristics with the other example methods, nodes, networks, and/or network components 100, 200, 300, 400, 500-570, 600, 700, 800, 900, 1100, 1100, and 1300, shown and/or discussed herein.

The example method 1200 begins executing at block 1205. The example method 1200 may begin executing in response to any of a variety of causes or conditions, non-limiting examples of which are provided herein. For example, the example method 1200 may begin executing in response to a user command to begin, in response to a signal received from a network node, in response to a detected traffic condition, in response to a detected emergency condition, in response to a timer, in response to power-up (or turn on) event at a system implementing any or all aspects of the example method 1200, etc.

At block 1210, the example method 1200 comprises communicating with one or more communication network nodes (e.g., root nodes, leaf nodes, intermediate nodes, vehicle network nodes, Mobile APs, Fixed APs, Network Controllers, backbone communication network nodes, cloud-based databases, etc.) regarding traffic control. As discussed herein (e.g., with regard to FIG. 10, FIGS. 7-9, etc.), such communication may comprise communicating information regarding sensor data (e.g., receiving sensor data, directing the collection of sensor data, etc.). Many non-limiting examples of such information have been provided herein. In an example implementation, block 1210 may comprise a central traffic controller receiving data from Mobile APs that have collected such data from any of a variety of sensors, where such data may be analyzed by the central traffic controller to make traffic control (or management) decisions.

Block 1210 may comprise performing such communicating in any of a variety of manners, non-limiting examples are provided herein. For example, block 1210 may comprise communicating with a Mobile AP and/or Fixed AP via a vehicle communication network link. Also for example, block 1210 may comprise communicating with a Mobile AP and/or Fixed AP via a cellular communication link. Additionally for example, block 1210 may comprise communicating with any of the nodes and/or sensors discussed herein via a wired or tethered optical link. Note that block 1210 may also, for example, communicate with a database (e.g., a cloud-based database) regarding traffic-related information gathered by other nodes.

In general, block 1210 may comprise communicating with one or more communication network nodes regarding traffic control. Accordingly, the scope of this disclosure should not be limited by characteristics of any particular manner of such communicating, any particular type of information related to traffic control, etc.

At block 1220, the example method 1200 comprises receiving vehicle situational data. As discussed herein, traffic management decisions may consider current traffic conditions, current vehicle priority, etc. Block 1220 may, for example, comprise receiving any relevant information regarding one or more particular vehicles, vehicles or traffic in general, etc. For example, block 1220 may comprise receiving information regarding emergency vehicles (e.g., police vehicles, firefighter vehicles, ambulances, etc.) that are presently involved in an emergency situation. Also for example, block 1220 may comprise receiving information regarding public transportation vehicles (or any vehicles) that may be in an emergency situation. Additionally for example, block 1220 may comprise receiving information regarding public transportation or other public service vehicles that are currently behind schedule or are in imminent danger of being behind schedule.

Block 1220 may, for example, comprise receiving such information in any of a variety of manners. For example, block 1220 may comprise receiving such information (e.g., in a solicited or unsolicited manner) from any of a variety of sources. For example, block 1220 may comprise receiving such information from a fleet controller, emergency dispatch service, etc. Also for example, block 1220 may comprise receiving such information from the vehicles (e.g., vehicle on-board communication systems, on-board Mobile APs, etc.). Additionally for example, block 1220 may comprise receiving such information from third party systems that are independent of the emergency (or other high-priority) situation (e.g., witnesses to an accident and/or presence of an emergency vehicle, customer complaints regarding an overdue public transportation vehicle, etc.).

Block 1220 may comprise receiving such information via any of a variety of communication pathways, for example comprising any one or more of a variety of communication networks. For example, block 1220 may comprise receiving such information via the Internet, via a vehicle communication network, via a cellular network, etc.

In general, block 1220 may comprise receiving vehicle situational data. Accordingly, the scope of this disclosure should not be limited by characteristics of any particular manner of performing such receiving, any particular type of vehicle situational data, etc.

At block 1230, the example method 1000 comprises analyzing the data received at blocks 1210 and block 1220 (and/or in addition to other information), for example to determine whether a traffic control operation should be performed (e.g., to determine whether to implement traffic control measures at local traffic control systems or devices). Block 1230 may comprise performing such analyzing in any of a variety of manners, non-limiting examples of which are provided herein.

Block 1230 may, for example, comprise identifying priority vehicles and their respective anticipated (or known) routes. For example, block 1230 may (e.g., based on information received at block 1220) comprise identifying emergency vehicles as highest priority vehicles and determine to implement traffic control measures, if necessary, to assist the movement of such vehicles. Block 1230 may then (e.g., based on information received at block 1210) determine whether the movement of the emergency vehicles meets requirements or whether one or more traffic control measures need to be taken to support movement of the emergency vehicles. For example, if an emergency vehicle is presently moving at an appropriate speed and the anticipated route of the emergency is not known to have any obstacles to movement of the emergency vehicle, block 1230 may comprise determining that traffic control measures are unnecessary for the emergency vehicle.

For example, in an example scenario, block 1230 may (e.g., based on information received at block 1220) determine that an emergency vehicle is transporting a seriously-wounded person to a hospital. Block 1230 may also (e.g., based on information received at block 1210) determine that an intersection between the emergency vehicle and the hospital is presently impassable. Block 1230 may thus identify a remedial measure to clear the intersection prior to the arrival of the emergency vehicle at the intersection.

In another example scenario, block 1230 may (e.g., based on information received at block 1220) determine that a public transportation vehicle is significantly behind schedule. Block 1230 may also (e.g., based on information received at block 1210) determine that the public transportation vehicle may be placed back on schedule by conducting one or more traffic light control operations. Additionally, block 1230 may determine that the identified traffic light control operations do not interfere with any higher priority (e.g., emergency vehicle, etc.) traffic. For example, block 1230 may decide to refrain from implementing a traffic control measure that assists a public transportation vehicle if that traffic control measure will interfere with movement of an emergency vehicle.

In still another example scenario, block 1230 may (e.g., based on information received at block 1220) determine that a taxi vehicle is stopped at an intersection at a red light. Block 1230 may also (e.g., based on information received at block 1210) determine that the taxi vehicle is unnecessarily stopped, for example no cross traffic is present or imminent. Additionally, block 1230 may determine that controlling the traffic light to enter a green state will not interfere with any higher priority (e.g., emergency vehicle, public transportation vehicle, etc.) traffic.

In an example scenario in which various traffic control measures (e.g., changing light color, opening/closing gates, raising/lowering bridges, changing programmable signs, etc.) have both significant positive and negative effects, block 1230 may comprise processing the data in a cost function to determine a best traffic control strategy. For example, the severity of emergencies may be weighed to determine which emergency vehicle to favor. Also for example, the amount of time that public transportation vehicles are behind schedule may be analyzed so that the traffic control strategy that best serves the public transportation vehicle that is the most late, or that has the most positive impact on aggregate lateness of all of the public transportation vehicles, may be selected.

In general, block 1230 comprises analyzing data to determine whether a traffic control operation should be performed. Accordingly, the scope of this disclosure is not limited by any particular type of information analyzed, any particular manner of performing such analyzing, etc.

The example method 1200 may, at block 1240, direct execution flow of the example method 1200 based on the analysis at block 1230. For example, if at block 1230 it is determined that no local traffic control measures will be taken, execution flow of the example method 1200 may return to block 1210 for continued execution. Note that such flow may be directed to any block of the example method 1200 (or portion thereof) or to any method block (or functional step) discussed herein. If at block 1230 it is determined to perform one or more traffic control measures, then the execution flow of the example method 1200 is directed to block 1250.

At block 1250, the example method 1200 comprises communicating control information (e.g., control commands, configuration parameters, etc.) to local traffic control systems. As discussed herein, such communication may be performed in any of a variety of manners, for example through any of a variety of communication networks. For example, in an example emergency scenario in which time is of the essence, block 1250 may comprise communicating the control information through a cellular communication link (if possible), terrestrial landline communication link (if possible), etc. Also for example, in an example scenario in which a relatively short delay is allowable (e.g., to assist a public transportation vehicle along its route), block 1250 may comprise communicating the control information through the vehicle network. Note that latency may be capped in a manner that reverts to utilizing a cellular (or landline) communication network if other networks (e.g., a vehicle communication network, a proprietor's public hotspot, etc.) cannot deliver the control information in the allotted time. Additionally for example, in various scenarios in which time is of little importance (e.g., control commands to assist construction vehicles in a project that is starting the following week) various control information may be communicated in a delay tolerant manner.

Figure 13:
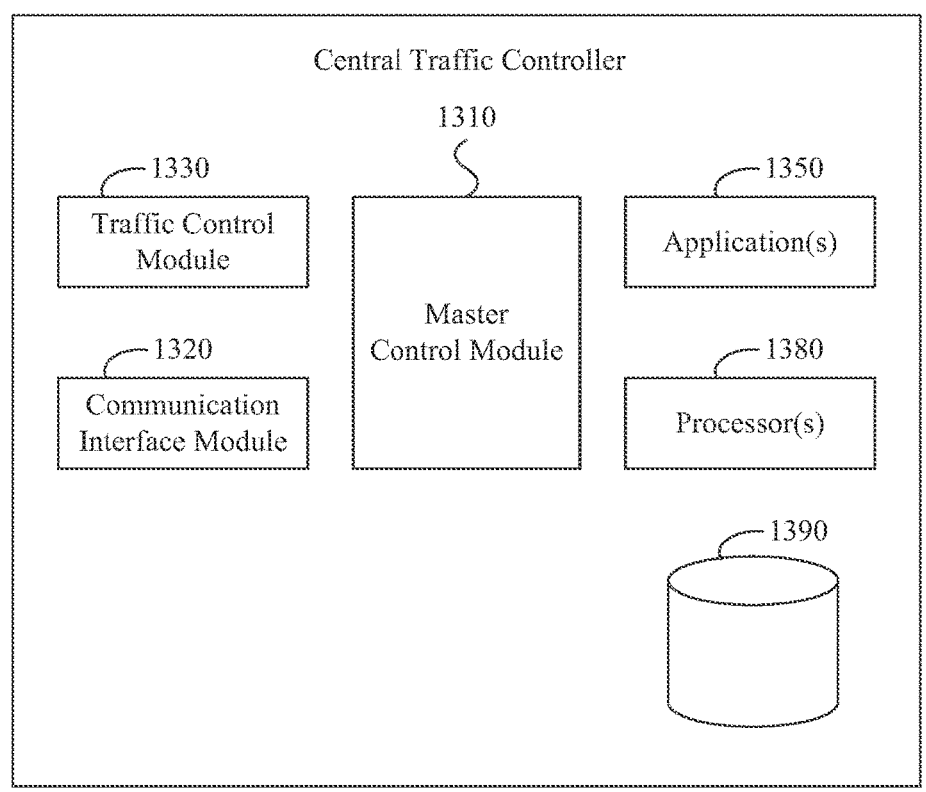
FIG. 13 shows a block diagram of an example central traffic controller, in accordance with various aspects of the present disclosure.

FIG. 13 shows a block diagram of various components of an example Central Traffic Controller (CTC), in accordance with various aspects of the present disclosure. The example CTC 1300 may, for example, share any or all characteristics with the other example methods, nodes, networks, and/or network components 100-1200, discussed herein. For example, any or all of the components of the example Network Controller 1300 may perform any or all of the method steps presented herein. Although the CTC 1300 is presented here in the context of a central (e.g., cloud-based) controller, it should be understood that any or all aspects of the example CTC 1300 may be implemented in any (or any combination) of the nodes discussed herein. For example, in an example implementation, the CTC 1300 may be implemented in a distributed manner among the Mobile APs and/or Fixed APs of the vehicle network.

The example CTC 1300 may, for example, comprise a Communication Interface Module 1320 that operates to perform any or all of the wireless and/or wired communication functionality for the CTC 1300, many examples of which are provided herein (e.g., communication with databases, communication with local traffic control systems, communication with fleet controllers, communication with Fixed AP nodes, communication with Mobile AP nodes, communication with cellular (or other) base stations, landline communication, communication with the Cloud APIs or other entities, backhaul communication, etc.). The Communication I/F Module 1320 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), POTS communication, etc. For example, any of the example communication discussed herein between a CTC and a Mobile AP, between a CTC and a Fixed AP, between a CTC and a backhaul network, between a CTC and a local traffic controller, etc., may be performed utilizing the Communication I/F Module 1320.

The example CTC 1300 also comprises a Traffic Control Module 1330 that, for example, performs any or all of the traffic control functionality discussed herein (e.g., with regard to the example method 1200 of FIG. 12, with regard to the traffic control functionality discussed with regard to FIGS. 7-10, etc.). The Traffic Control Module 1330 may, for example, utilize communication services provided by the Communication Interface Module 1320 to perform various aspects of communication.

The example CTC 1300 may, for example, comprise a Master Control Module 1310 that generally manages operation of the CTC 1300 at a high level. Such Master Control Module 1310 may, for example, comprise various aspects of an operating system for the CTC 1300.

The example CTC 1300 may further, for example, comprise one or more Applications 1350 executing on the CTC 1300 (e.g., traffic control applications, client management applications, security applications, power management applications, vehicle monitoring applications, location services applications, user interface applications, etc.).

The example CTC 1300 may also comprise one or more Processors 1380 and Memory Devices 1390. The Processor(s) 1380 may, for example, comprise any of a variety of processor characteristics. For example, the processor(s) 1380 may comprise one or more of a general purposes processor, RIS processor, microcontroller, ASIC, DSP, video processor, co-processor, etc.). The Memory Device(s) 1390 may, for example comprise any of a variety of memory characteristics. For example, the Memory Device(s) 1390 may comprise a volatile memory, non-volatile memory, etc. The Memory Device(s) 1390 may, for example, comprise a non-transitory computer-readable medium that comprises software instructions that when executed by the Processor(s) 1380, cause the CTC 1300 to perform any or all of the functionality discussed herein (e.g., mobility management functionality, communication functionality, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for traffic management in a network of moving things. As non-limiting examples, various aspects of this disclosure provide systems and methods for utilizing vehicles, vehicle sensors, and/or vehicle-based networks of the Internet of moving things for traffic control optimization. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile access point (MAP) comprising:
   at least one module comprising a microprocessor and memory and being operable to, at least:
   provide wireless Local Area Network (LAN) access to personal electronic devices;
   provide Internet connectivity to the personal electronic devices via a communication network exclusive of a cellular communication network;
   receive data collection control information from a central traffic controller (CTC), wherein the received data collection control information comprises:
   first information indicating a manner in which the MAP is to collect traffic-related sensor data from sensors along a travel route of the MAP; and
   second information indicating whether the collected traffic-related sensor data is to be communicated to the CTC immediately or is to be communicated to the CTC within a particular amount of time;
   as the MAP travels along the travel route, at least:
   establish wireless communication links with the sensors along the travel route;
   collect the traffic-related sensor data from the sensors via the established communication links; and
   communicate the collected traffic-related sensor data to the central traffic controller (CTC) in accordance with the first information of the received data collection control information.

2. The mobile access point of claim 1, wherein the second information of the received data collection control information indicates that the collected traffic-related sensor data is to be communicated immediately via a cellular network.

3. The mobile access point of claim 1, wherein the second information of the received data collection control information indicates that the collected traffic related sensor data is to be communicated via a vehicle network.

4. The mobile access point of claim 1, wherein the data collection control information comprises third information that identifies a fixed geographical location of the sensors and communication network address information for the sensors.

5. The mobile access point of claim 1, wherein the at least one module is operable to:
receive traffic control command information from the CTC, wherein the traffic control command information identifies a local traffic gate control system; and
communicate the received traffic control command information to the identified local traffic gate control system.

6. The mobile access point of claim 5, wherein the at least one module is operable to communicate the received traffic control command information to the identified local traffic gate control system in a multi-hop wireless communication link comprising at least one other mobile access point.

7. The mobile access point of claim 1, wherein the at least one module is operable to:
receive traffic control command information from the CTC, wherein the traffic control command information identifies a local traffic control system; and
communicate the received traffic control command information to the identified local traffic control system in a direct wireless communication link of the wireless LAN between the MAP and the identified local traffic control system.

8. A traffic control system comprising:
at least one module comprising a microprocessor and memory and being operable to, at least:
establish communication links with a mobile access point (MAP) of a vehicle communication network via the Internet and via the vehicle communication network exclusive of a cellular network, wherein the MAP is operable to provide wireless Local Area Network (LAN) service to personal electronic devices;
communicate data collection control information to the MAP, wherein the data collection control information comprises:
first information indicating a manner in which the MAP is to collect traffic-related sensor data from sensors along a travel route of the MAP; and
second information indicating whether collected traffic-related sensor data is to be communicated to the CTC immediately or is to be communicated to the CTC within a particular amount of time;
receive traffic-related sensor data from the MAP; and
determine whether to command operation of a local traffic control system, based at least in part on the received traffic-related sensor data.

9. The traffic control system of claim 8, wherein the second information of the communicated data collection control information indicates that the collected traffic-related sensor data is to be communicated immediately via a cellular network.

10. The traffic control system of claim 8, wherein the second information of the received data collection control information indicates that the collected traffic related sensor data is to be communicated via a vehicle network.

11. The traffic control system of claim 8, wherein the data collection control information comprises third information that identifies a fixed geographical location of the sensors and communication network address information for the sensors.

12. The traffic control system of claim 8, wherein the at least one module is operable to communicate traffic control command information to the MAP, wherein the traffic control command information identifies a local traffic gate control system.

13. The traffic control system of claim 12, wherein the traffic control command information comprises information identifying a geographical location of the local traffic control system.

* * * * *